No. 646,940. Patented Apr. 10, 1900.
J. AUMUND.
TACHOMETER.
(Application filed July 1, 1898.)
(No Model.)
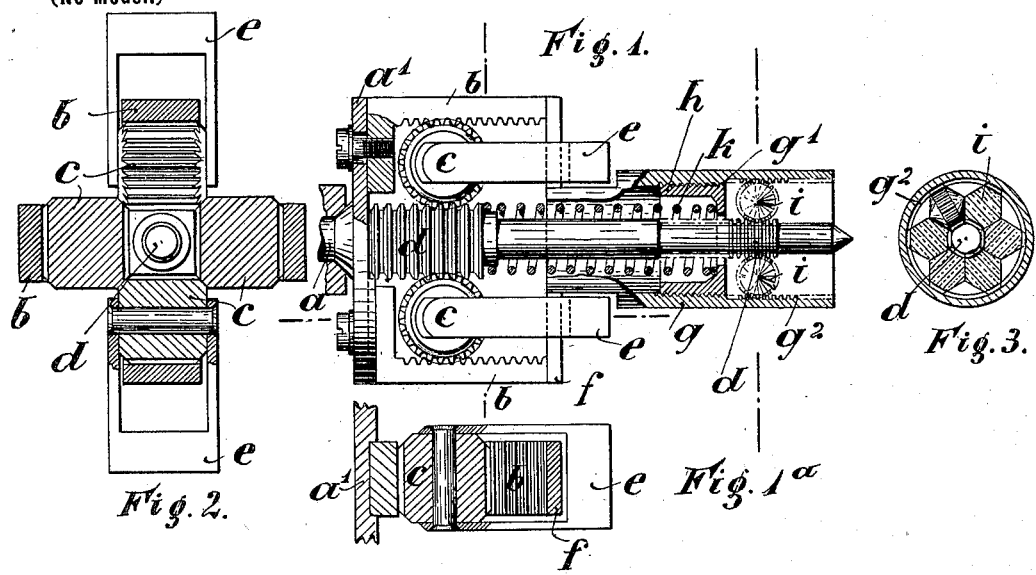
Fig. 1.
Fig. 2.
Fig. 1ᵃ.
Fig. 3.
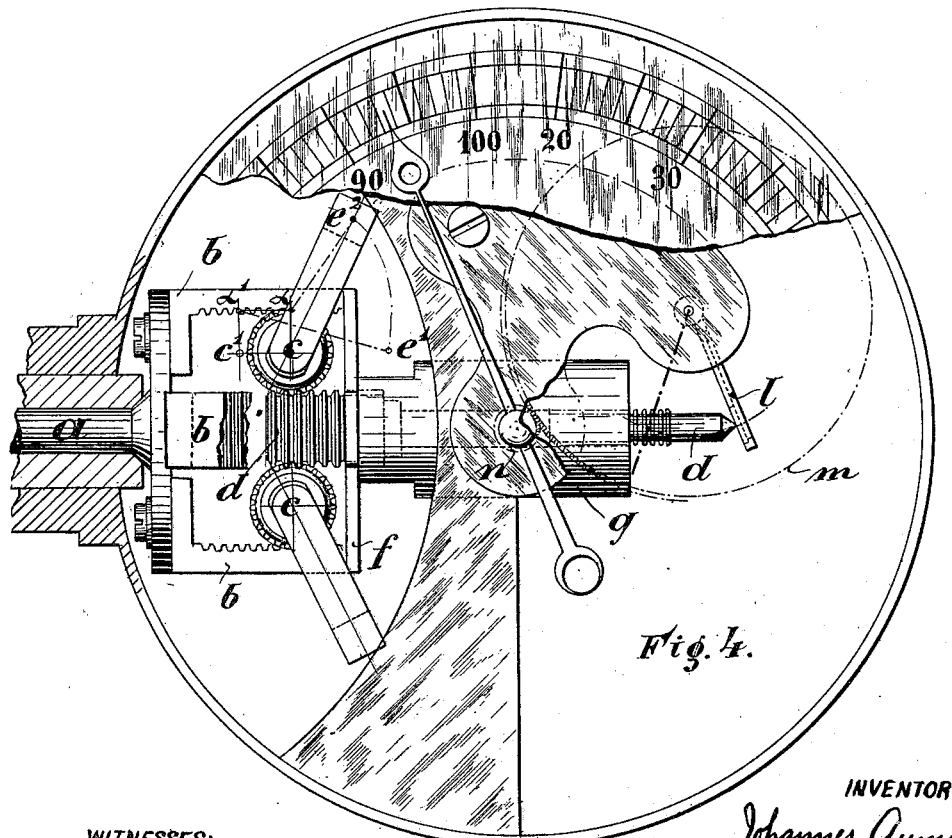
Fig. 4.
WITNESSES:
Ella L. Giles
INVENTOR
Johannes Aumund
BY Richards & Co.
ATTORNEYS

UNITED STATES PATENT OFFICE.

JOHANNES AUMUND, OF ZURICH, SWITZERLAND.

TACHOMETER.

SPECIFICATION forming part of Letters Patent No. 646,940, dated April 10, 1900.

Application filed July 1, 1898. Serial No. 684,961. (No model.)

*To all whom it may concern:*

Be it known that I, JOHANNES AUMUND, a citizen of the Republic of Switzerland, and a resident of Zurich, Switzerland, have invented certain new and useful Improvements in Tachometers, of which the following is a full, clear, and exact specification.

In tachometers as heretofore known, fixed pivots were employed with pins or fixed bearings for that part of the device which changes the pendulum-stroke into a reciprocating movement. It is to be understood that in the former case the pins or pivots, weighted by the centrifugal force of the swinging pendulums, offer resistance to the free movement of the pendulums by their friction, and that therefore the pendulums are not able to assume immediately after any variation of speed their corresponding positions suited to the change. When the variation of the velocity increases further, a certain yielding by impact takes place, causing the pendulums to swing beyond the real corresponding position. The consequence of this is a jerky movement or thrust of the indicator. To obviate this, artificial damping has been tried; but if the revolving seesawing transmission-piece is guided by fixed bearings another drawback arises from the circumstance that risings are wrought on every shaft or arbor from continual running in pillows or bearings, which unevennesses will work corresponding hollows into the bearings, and thus form another obstacle to the free movement of the transmission-piece. Precise balancing of the indicator will become impossible from the said causes. Precision of indication depends more or less, but to a great extent, on regular lubrication of this pillow and on the lubricating material employed. These drawbacks are overcome by the present invention, as all pivot or shaft bearings are avoided in the pendulum mechanism and only a rolling movement is employed, which puts the least resistance to the exact function of the swinging pendulums, and thereby renders it possible that the indicator indicates in a manner free from jerks and in true accordance with the go of the controlled machine. Finally, the attending to and lubricating of the interior elements become superfluous, and wear and tear inevitable with pivots and bearings are excluded.

In the accompanying drawings, Figure 1 is partly a sectional view and partly a side elevation of the device in its resting position or condition. Figs. 2 and 3 represent transverse sections. Fig. 4 represents the mechanisms in a casing, the pendulums being in the vicinity of their extreme position, and hand, and a part of the dial.

In the drawings, $a$, Fig. 1, is the driving-shaft, which carries a plate $a'$. On this plate or disk four racks $b\ b$ are so arranged that their teeth face each other. Four cog-wheels $c\ c$ engage the racks, and between these, also engaging with toothed wheels, is a four-edged rack $d$, which is toothed at all four sides. One part of the cog-wheels $c\ c$ carry the swinging pendulums $e\ e$, which encompass the racks with forked arms, Fig. 1$^a$, and these governor-pendulums tend to revolve the wheels by the centrifugal force produced by the rotation of the shaft $a$ and to displace thereby the rack $d$. The racks $b\ b$ are connected at their extremities by a cruciform plate $f$, which carries a collar $g$. This collar or sleeve has an interior thread at $g'$, and the piece $h$ is screwed therein. The one extremity of the tension-spring $k$ props against the piece $h$, and its other end rests against a space of the rack $d$, and thus maintains equipoise against the displacement caused by the centrifugal force by its pressure. The collar $g$ is provided at $g''$ with annular interior grooves, so that it represents a rack in longitudinal section. Into this collar the cog-wheels $i\ i$ are set, which engage the said ripples of the collar and which guide between them the rippled cylindrical extension of $d$, which also representsa rack in its longitudinal section here. Each group of cog-wheels have a uniform number of teeth, and each wheel is provided with conical extensions apt to secure exact guidance of each other. These extensions are in contact with those of the neighboring wheels, the conical wheels thus working together. Fig. 2 shows this arrangement for the wheel group $c\ c$ and Fig. 3 for the wheel group $i\ i$.

While the pendulum traverses the way from $e'$ to $e^2$, Fig. 4, the wheel $c$ rolls from $c'$ on the rack $b$ and therein displaces the rack $d$, which is engaged therewith. As all wheels of this group have a uniform number of teeth and are engaged with the rack $d$, all wheels advance or return on the same length of way with the pendulum movement. Therefore they always remain in the same position to each other and are always guided along each other by their cones. The same is true of the wheels of group $i\ i$, which also move with the movement of the rack $d$ equal to half of the way from $d$, and they are always kept in the same position to each other and guide each other by their cones. The movement of the part $d$ caused by the pendulum-stroke is then appropriately transmitted to the hand by the lever $l$ and wheels $m$ and $n$.

As shown in Fig. 4, the effective pendulum-arm shortens at the stroke of the pendulum. This arm finds its pivot in the pitch-line of the rack $b$ and is equal to $x'\ e'$ when at rest, and near the extreme position it is equal to $x\ e$. Thereby with lesser velocities a comparatively-greater energy is obtained in comparison with greater velocities, and the efficacy of the spring is less influenced at equal variations of velocity when their limit of elasticity is approached. Thus the spring is relieved and the purpose of maintaining the scale in the widest possible limits is served.

I claim—

In combination in a tachometer, the governor parts arranged to move by centrifugal force, the cog-wheels connected to said parts to be rotated by the movement thereof, the transmitting-rack $d$ meshing with the cog-wheels, said cog-wheels serving as bearings for the rack and having conical faces by which they guide each other, and the guide-racks meshing with the cog-wheels and rotating with the driving-shaft, substantially as described.

In testimony whereof I have hereunto set my hand in presence of two witnesses.

JOHANNES AUMUND.

Witnesses:
KARL KARASCKN,
FRIEDRICH ALBERT GEIGER.